United States Patent [19]

Anthony

[11] 4,058,723
[45] Nov. 15, 1977

[54] ILLUMINATION AND DETECTION SYSTEM FOR MICROFICHE IDENTIFICATION MARKS

[75] Inventor: Romuald Anthony, Manhattan Beach, Calif.

[73] Assignee: Cutler-Hammer, Inc., Milwaukee, Wis.

[21] Appl. No.: 690,352

[22] Filed: May 26, 1976

[51] Int. Cl.² .......................... G02F 1/01; H01J 39/12
[52] U.S. Cl. .................................... 250/235; 250/567; 209/111.7 R
[58] Field of Search .............. 250/225, 567, 568, 569, 250/566, 215, 555, 556; 235/61.11 E; 209/111.7 R, 111.6, 111.8; 353/27 R, 27 A

[56] References Cited

U.S. PATENT DOCUMENTS

| | | | |
|---|---|---|---|
| 2,726,173 | 12/1955 | Martin | 250/225 |
| 2,947,212 | 8/1960 | Woods | 250/225 |
| 3,812,374 | 5/1974 | Tuhro | 250/225 |
| 3,899,687 | 8/1975 | Jones | 250/225 |
| 3,986,612 | 10/1976 | Kamm et al. | 209/111.7 |

*Primary Examiner*—Alfred E. Smith
*Assistant Examiner*—David K. Moore
*Attorney, Agent, or Firm*—Kevin Redmond

[57] ABSTRACT

In order to detect the identification marks on an exposed transparent card in a stack of similar cards, the identification marks on the exposed card are illuminated by polarized light that is incident at an angle greater than the polarizing angle of the transparent material of the cards. The high angle of incidence and the polarization of the incident light reduce the transmission of light through the exposed card, and thereby reduce the illumination and probability of detection of identification marks on a card adjacent the exposed card.

14 Claims, 2 Drawing Figures

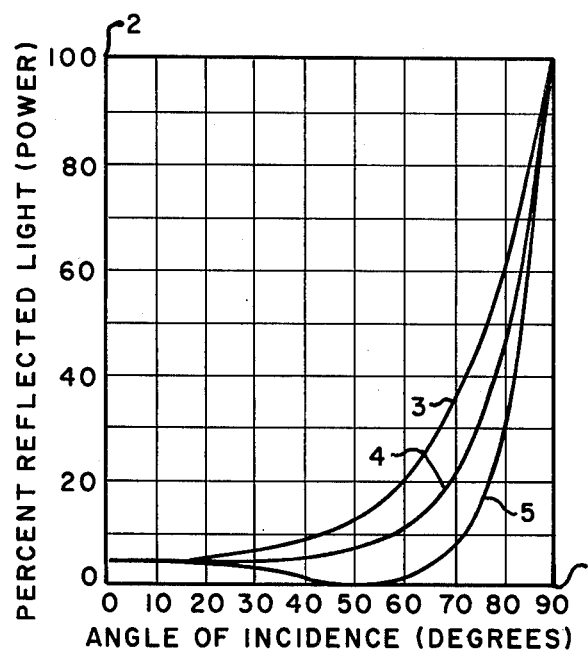
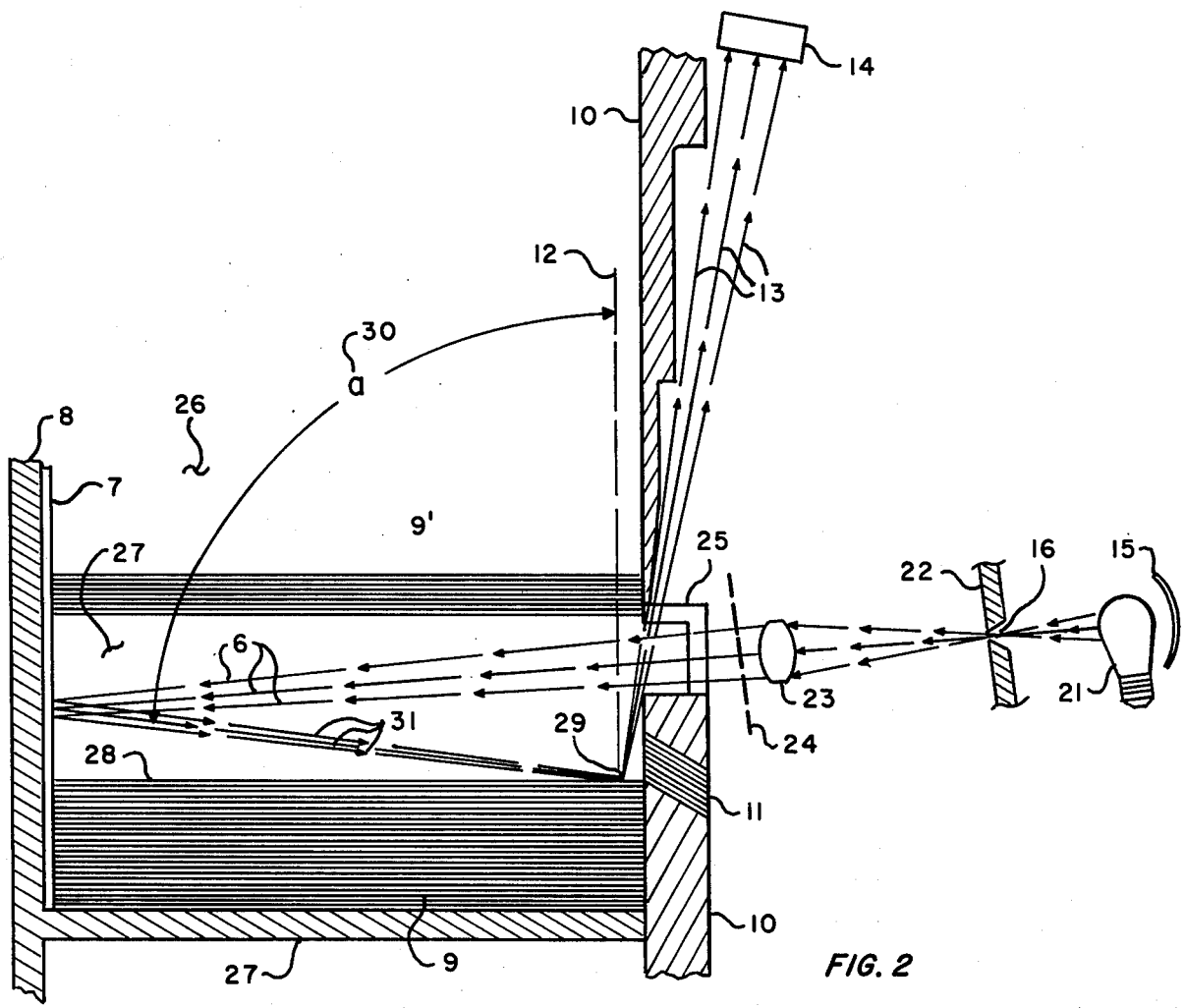
FIG. 1
FIG. 2

ILLUMINATION AND DETECTION SYSTEM FOR MICROFICHE IDENTIFICATION MARKS

FIELD

This invention relates to the detection of identification marks on transparent cards and particularly to the detection of identification marks on microfiche cards stored in stacks.

PRIOR ART

Transparent cards such as microfiche cards are commonly used as the storage medium in information storage and retrieval systems. Generally the cards in such systems carry individual identification marks, but despite these individual marks, the identification and location process is usually slow and involves considerable manipulation of the cards.

A conceptually simple, and commonly applied method of detecting identification marks on transparent cards in systems where the cards are stored in stacks is to remove a card from the stack, direct a light beam from a light source through an identification area on the card, and detect the light pattern on the side of the card opposite the light source. This is a slow process that requires the cards to be removed from the stack before they can be identified. The continuous manipulation of the cards required by this type of identification process results in appreciable card wear. One method of reducing the wear requires each card to be encased in a holder; however, the holder adds considerable cost and volume, and therefore constitute an undesired, but necessary, component of the microfiche cards in many conventional systems.

A card identification system that eliminates the holders and much of the card wear is described in copending U.S. application Ser. No. 521,635, now U.S. Pat. No. 3,986,612. In this system, the cards are never removed from the stack for identification purposes. A card is exposed by a separation in the stack produced by an air stream. The identification marks on the exposed card are detected by means located outside of the stack.

FIG. 2 is a cross sectional view of an embodiment of the present invention that includes the essential features of the prior art invention described in U.S. application Ser. No. 521,635. Therefore, this Figure will be used to describe the prior art system disclosed in U.S. application Ser. No. 521,635, as well as the present invention.

Referring now to FIG. 2, a cavity 26 is formed by a front wall 10, a lower wall 27 and a rear wall 8. An air nozzle 11 and a window 25 are mounted on the front wall. The cavity contains a number of cards separated into a lower stack 9 and an upper stack 9' by an air stream projected from the nozzle 11. All of the cards in the stack contain a pattern of identification marks located in an identification area on their surfaces near the wall 10, such as the identification area denoted by drawing numeral 29 on the top card 28 of the stack 9. A light source for illuminating the identification area through the window 25 and a detector 14 for receiving the light reflected by the identification marks are located outside of the chamber 26. In the prior art system, the light source and detector are located adjacent one another in the vicinity of the detector 14; however, in the present invention, the two are separated as shown in FIG. 2.

To search a selected portion of the stack, the wall 10 is moved in the vertical direction. This movement transports the nozzle, the light source and detector, as these components are rigidly mounted to the wall by conventional means, not shown. Air under pressure is applied to the nozzle to project a stream in a localized region on one side of the stack. The air stream produces a separation in the stack 27 and exposes a card, such as card 28. The light source and detector are aligned to illuminate and detect the identification marks on the exposed card and remain aligned as the wall is moved from location to location because of the rigid connection of these components to the wall.

In the prior art system, the light source, in its location adjacent the detector 14, projects a light beam generally downward through the window 25 to the identification area 29. The light penetrates clear areas on the exposed card, illuminating the identification marks on the card below. The light penetration is made possible by the type of identification marks commonly used on microfiche cards. These marks are usually digitally coded with a diffuse reflecting area repesenting a digital "one" and a clear area representing a digital "zero". The light projected from the light source penetrates a clear digital "zero" area on the exposed card to illuminate an area on the card below that may contain a digital "one". The light reflected to the detector by a digital "one" on the card below is usually sufficiently strong to be erroneously interpreted by the detector as a "one" on the exposed card. The ratio of light reflected from a "one" on the card below to a "one" reflected by the exposed card is often so nearly unity that critical adjustment of a number of parameters, including the detector threshold, is necessary to distinguish the difference between the two marks. The critical nature of these adjustments is usually so severe that it is difficult to fabricate a reliable system using this method of illumination.

SUMMARY

The primary object of the present invention is to provide a system for accurately detecting the identification marks on an exposed microfiche card stored in a stack, while avoiding the detection of the identification marks on a card adjacent the exposed card. Another object is to provide a reliable system that does not require critical adjustment of the system parameters, such as the detector threshold.

The identification area on an exposed card in a stack of transparent cards is illuminated by light that impinges on the identification area of the exposed card at an angle of incidence greater than the polarizing angle of the cards to reduce the light transmitted through the exposed card to an adjacent card. The reduction in amount of light transmitted through the exposed card reduces the illumination of the identification marks on the adjacent card, thereby making it possible to avoid the erroneous detection of the marks on the adjacent card. To further reduce the light transmitted through the exposed card, the light incident on the exposed card is polarized with the electric field vector oriented perpendicular to the plane of incidence.

In a preferred embodiment of this invention, a selected card in a stack is exposed by a separation in the stack produced by an air stream. Light from a light source, located on one side of the stack, is directed through the stack separation to a specular reflector located on the opposite side of the stack. The light is redirected by the reflector back through the separation to impinge on the identification area at a high angle of incidence.

DRAWINGS

FIG. 1 is a graph showing the percentage of light reflected from a transparent surface as a function of the polarization of the incident light and the angle of incidence.

FIG. 2 is a cross sectional view of a preferred embodiment of the invention.

DETAILED DESCRIPTION

The present invention provides a means of illuminating and detecting identification marks on an exposed microfiche card stored in a stack of similar cards, while reducing the erroneous detection of identification marks on a card adjacent the exposed card. The means of illumination and detection described herein is especially useful in high volume, high speed storage and retrieval systems such as that described in copending U.S. Pat. application Ser. No. 521,635.

Referring to FIG. 1, the abscissa 1 represents the angle of incidence while the ordinate 2 represents the percentage of reflected light from a transparent incident surface. An incident surface is defined herein as a surface of interest on which light impinges, such as the surface of a microfiche card. The angle of incidence is defined as the angle between the incident light ray and the normal to the incident surface at the point of incidence. In FIG. 2, the angle of incidence, $\alpha$ denoted by drawing numeral 30, lies between incident light rays 31 and the normal 12 to the incident surface 28 at the point of incidence 29.

Returning to FIG. 1, curve 3 shows the percentage of light reflected from an incident transparent surface, where the incident light is polarized perpendicular to the plane of incidence. The direction of polarization is considered herein to coincide with the orientation of the electric field vector. The plane of incidence is defined as the plane that includes the incident light ray and is perpendicular to the incident surface at the point of incidence.

Curve 4 shows the percentage of light reflected by randomly polarized light, while Curve 5 shows the percentage of light reflected by light polarized in the plane of incidence. Light not reflected is transmitted through the incident surface. In systems where fiche are identified without removing the fiche from the stacks, the light transmitted through an exposed fiche presents a problem as it illuminates the identification marks on an adjacent fiche.

It can be seen from Curve 5 that at an angle of incidence of approximately 55° there is no light reflected from the incident surface for light polarized in the plane of incidence and therefore all such light is transmitted through the incident surface. This angle is referred to as the polarizing angle. As the angle of incidence is increased beyond the polarizing angle, the percentage of light reflected increases rapidly, resulting in a reduction of the light transmitted through a transparent card to an adjacent card; however, at 90° there is no illumination of the surface. It has been found in a practical application that an angle of incidence of approximately 80° is optimum for proper illumination and minimum transmission through the card. Curve 3 shows that regardless of the angle of incidence, the lowest percentage of light transmitted through a card occurs where the light is polarized perpendicular to the plane of incidence. Therefore, a system designed for minimum light transmission through an incident surface must include provisions to polarize the incident light perpendicular to the plane of incidence and direct the incident light to impinge on the incident surface at an angle that exceeds the polarizing angle of the cards.

FIG. 2 shows a system that incorporates these provisions. In this Figure, the light from a light source 21 is directed at an aperture 16 in a light shield 22 by suitable means, such as a parabolic reflector 15. The light from the aperture 16 is passed through a focusing lens 23, a polarizer 24, and the window 25 to a specular reflector 7 located against the rear wall 8 of the cavity 26. The light is redirected by the specular reflector 7 to the identification area 29 on the card 28. Light reflected by the identification marks, indicated by drawing numeral 13, is passed through the window 25 to the detector 14.

The redirection of the light entering the chamber by the specular reflector 7 makes possible the illumination of identification marks located adjacent the wall 11 at a high angle of incidence. This arrangement eliminates the erroneous detection of the identification marks on a card adjacent the exposed card, while enabling a simple method of transporting and aligning the nozzle, detector and light source to be carried out by merely rigidly connecting these components to the wall 10.

Each of the components through which the light passes or by which it is reflected serves one or more important functions in the illumination process. The function of the aperture 16 in the light shield 22 is to limit the light entering the chamber to that sufficient to illuminate only the identification area. The shield prevents excessive light from entering the chamber. The excessive light would subsequently emerge through the window 25 by way of reflection from the surface of the fiche to produce a source of interference in the detection of the identification marks.

The lens 23 corrects any divergence in the light after it passes through the aperture 16. Correction of such divergence prevents the uneven illumination of the identification area and also prevents the illumination of areas of the card outside the identification area. Without this correction, special adjustment of the detector threshold is required to compensate for such uneven illumination. Illumination of areas outside the identification area can introduce an identification interference problem similar to that caused by excessive light entering the chamber.

The lens 23 focuses the aperture 16 on the identification area. Often, a collimating lens may be used for this function and in such cases the divergent light is redirected so that the rays in the beam emerging from the lens are generally parallel to one another, as shown in FIG. 2 by light rays 6.

The polarizer 24 may be simply a polarizing filter positioned to pass only the light components polarized perpendicular to the plane of incidence.

The reflector 7 is shown in FIG. 2 as a separate, plane specular reflector; however, a number of alternatives are possible. For example, the rear wall 8 of the chamber may be polished to serve as the reflector, or this reflector may be curved to serve as a lens supplementing or replacing the lens 23.

A number of different identification marks are suitable for use with the present invention. A simple and permanent type of diffuse reflecting marks is produced by abrading the surface of the fiche. A second type of permanent identification mark is produced by forming a "sawtooth" indentation in the surface of the fiche. One surface of each "tooth" is oriented to receive the light from the reflector 7 and reflect it to the detector 14. Since this type of indentation is often used to produce a retroreflective surface, the reflection from this type of indented surface is considered herein as a special form of retroreflection.

The light from such retroreflective marks may be directed over a wide angle with respect to the surface of the fiche. The light reflected by a diffuse reflecting mark is scattered over a wide angle, therefore, the location of the detector to receive this light is not critical, provided the detector is not positioned where it will receive light reflected from a specular portion of the fiche surface in the identification area. Such a specular reflection can be erroneously interpreted by the detector as an identification mark. Fortunately, there is little difficulty in avoiding the reception of a specular reflection as the angle over which such a reflection may be received is small in comparison to the angle over which satisfactory reception of light from the identification marks may be received.

I claim:

1. Apparatus for producing a representation of identification marks in an identification area on an exposed card in a stack of transparent cards, comprising:
   a. a light source,
   b. light polarizing means,
   c. means for directing the light from the source to the identification area to impinge on the exposed card at an angle of incidence greater than the polarizing angle of the cards, said means including reflecting means positioned adjacent said transparent cards opposite the identification area to receive the light from the light source and direct it to impinge on the identification area at an angle of incidence greater than the polarizing angle of the cards and said means further including light shielding means to generally confine the light incident on the card to the identification area and means to detect said light.

2. Apparatus as claimed in claim 1, wherein the angle of incidence is greater than 55°.

3. Apparatus as claimed in claim 2, wherein the angle of incidence is approximately 80°.

4. Apparatus as claimed in claim 1, wherein the surfaces of the cards are specularly reflective, the identification marks are retroreflective and the detection means is positioned to receive light from the light source by way of retroreflection from said marks, but not by way of specular reflection from said area.

5. Apparatus as claimed in claim 1, wherein the surfaces of the cards are specularly reflective, the identification marks are diffuse reflecting areas within the identification area and the detection means is positioned to receive light from the light source by way of diffuse reflection from the identification marks, but not by way of specular reflection from the identification area.

6. Apparatus as claimed in claim 5, wherein said diffuse reflecting identification marks are abraded areas in the identification area.

7. Apparatus as claimed in claim 1, wherein said polarizing means is positioned in the light path between the source of light and the identification area to polarize the light incident on the identification area perpendicular to the plane of incidence.

8. Apparatus as claimed in claim 1, further comprising focusing means positioned in the path of light between the light source and the identification area to evenly distribute the incident light over the identification area.

9. Apparatus as claimed in claim 1, further comprising focusing means positioned in the path of light between the identification area and the light shield means, said polarizing means positioned in the light path to polarize the light incident on the identification area perpendicular to the plane of incidence and reflecting means positioned to receive the light and direct it to impinge on the identification area at an angle of incidence greater than the polarizing angle of the cards.

10. Apparatus as claimed in claim 9, wherein the surfaces of said cards are specularly reflective, said identification marks are abraded diffuse reflection areas in the identification area and the detection means is positioned to receive the light from the identification marks by way of diffuse reflection from said marks, but not by way of specular reflection from said identification area.

11. Apparatus as claimed in claim 9, wherein said card is exposed by a separation in the stack, said light source, focusing means, said polarizing means and detection means are positioned generally adjacent one another outside of said stack and to one side thereof, the identification marks are positioned on the surface of the exposed card along the edge adjacent the light source, and said reflecting means is located outside of the stack and to the side opposite the light source to receive the light from the light source through the separation and direct it back through the separation to the identification area.

12. A method of producing a representation of a pattern of identification marks contained in an identification area on an exposed card in a stack of transparent cards, comprising the steps of:
   a. providing a source of light,
   b. directing the light from the source at the identification area to impinge on the exposed card at an angle of incidence greater than the polarizing angle of the cards,
   c. providing a light detection means,
   d. positioning the light detection means to receive the light reflected from the said marks,
   e. providing light shielding means with an aperture to pass a portion of the light incident on the shield,
   f. positioning said shielding means in the path of light to generally confine the light incident on the card to the identification area,
   g. providing focusing means,
   h. positioning said focusing means in the light path between the shield and the identification area to evenly distribute the light over the identification area,
   i. providing polarizing means,
   j. positioning said polarizer in the light path to polarize the light perpendicular to the plane of incidence,
   k. providing reflecting means, and
   l. positioning said reflecting means to receive the light from the light source and direct it to impinge on the identification area at an angle of incidence greater than the polarizing angle of the cards.

13. A method as claimed in claim 12, wherein the identification marks on the surface of the exposed card are located along the edge adjacent the light source and said card is exposed by a separation in the stack, further comprising the steps of:

a. positioning the light source, focusing means, detection means and polarizing means generally adjacent one another outside the stack and to one side thereof, and
b. positioning said reflecting means on the side of the stack opposite the light source to receive the light from the source through the separation and direct it back through the separation to the identification area.

14. A method as claimed in claim 13, wherein the surfaces of said cards are specularly reflective, said identification marks are abraided diffuse reflecting areas in the identification area, and said method further comprises the step of positioning the detection means to receive the light from the source by way of diffuse reflection from said marks, but not by way of specular reflection from said area.

* * * * *